US012807441B2

(12) United States Patent
Matsumura

(10) Patent No.: US 12,807,441 B2
(45) Date of Patent: Nov. 24, 2026

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Takuya Matsumura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 18/919,203

(22) Filed: Oct. 17, 2024

(65) Prior Publication Data

US 2025/0128898 A1 Apr. 24, 2025

(30) Foreign Application Priority Data

Oct. 20, 2023 (JP) ................................ 2023-181299

(51) Int. Cl.

| | |
|---|---|
| ***B65H 7/16*** | (2006.01) |
| ***B65H 3/48*** | (2006.01) |
| ***B65H 7/14*** | (2006.01) |
| ***G03G 15/00*** | (2006.01) |

(52) U.S. Cl.

CPC ................. *B65H 7/16* (2013.01); *B65H 3/48* (2013.01); *B65H 7/14* (2013.01); *G03G 15/5029* (2013.01); *B65H 2511/416* (2013.01); *B65H 2557/64* (2013.01)

(58) Field of Classification Search

CPC ... B65H 3/48; B65H 7/14; B65H 7/16; B65H 2511/40; B65H 2511/416; B65H 2557/64; G03G 15/5029

See application file for complete search history.

(56) References Cited

U.S. PATENT DOCUMENTS

| | | | | |
|---|---|---|---|---|
| 2021/0078813 | A1 * | 3/2021 | Izumiya | B65H 5/062 |
| 2024/0286857 | A1 * | 8/2024 | Kawakita | B65H 29/00 |
| 2025/0074731 | A1 * | 3/2025 | Totsuka | B65H 3/08 |

FOREIGN PATENT DOCUMENTS

| | | |
|---|---|---|
| JP | 2010032632 A | 2/2010 |

* cited by examiner

*Primary Examiner* — Prasad V Gokhale

(74) *Attorney, Agent, or Firm* — Canon U.S.A., Inc. IP Division

(57) ABSTRACT

An image forming apparatus includes an air blowing unit that does not perform, in a case where a type of a first sheet detected by the paper type detection unit is a type that requires the air blowing, air blowing on a second sheet to be fed subsequent to a first sheet at least during a period from when a paper type detection unit detects a type of the first sheet to when the first sheet is fed to an image forming unit, and performs the air blowing on the second sheet after the image forming unit performs printing on the first sheet.

5 Claims, 7 Drawing Sheets

[1] START-UP
[2] SETTING OF JOB
[3] EXECUTION OF JOB AND FEEDING OF FIRST SHEET
[4] DETECTION OF PAPER TYPE
[5] IMAGE FORMING PROCESSING
[6] FEEDING OF SECOND SHEET

IMAGE FORMING APPARATUS, METHOD FOR CONTROLLING IMAGE FORMING APPARATUS, AND STORAGE MEDIUM

BACKGROUND

Field

The present disclosure relates to an image forming apparatus, a method for controlling the image forming apparatus, and a storage medium.

Description of the Related Art

There is an image forming apparatus that includes, on a paper conveying path, a paper type detection sensor (media sensor) for measuring, for example, a feature amount of paper, such as a surface property of paper and a basis weight of paper, to detect a type of paper. Such an image forming apparatus identifies the type of paper (paper type), for example, from a preliminarily stored paper type database (media library) based on a feature amount of paper fed in a print job. Such an image forming apparatus is capable of obtaining a high-quality print product by using a print control parameter of the identified paper type in image forming control.

Additionally, there is proposed an image forming apparatus including an air blowing mechanism that performs air blowing (air separation) with an air blowing fan on a bundle of sheets prior to feeding a sheet to separate the sheets that stick together and prevent double feeding. Japanese Patent Application Laid-Open No. 2010-32632 describes a technique of, before detecting a paper type, always performing air separation on a sheet bundle prior to feeding a sheet, thereafter, continuing the air separation in a case where the detected paper type is coated paper with a higher possibility for double feeding, and stopping the air separation in a case where the detected paper type is not the coated paper.

However, according to a technique of Japanese Patent Application Laid-Open No. 2010-32632, in a case where a detected paper type of a first sheet is a paper type with a high possibility for double feeding, air separation is performed on a second sheet to be fed subsequent to the first sheet after the detection of the paper type of the first sheet. In this case, since the air separation is performed on the second sheet before the second sheet is ready to be fed, there is an issue that electricity may be consumed due to unnecessary air separation.

SUMMARY

The present disclosure has been made in view of the issues discussed above, and is directed to provision of a technique that enables, in a case where air blowing needs to be performed on sheets prior to feeding a sheet, suppression of power consumption due to unnecessary air blowing.

According to an aspect of the present disclosure, an image forming apparatus includes an image forming unit configured to perform printing on a sheet; a paper feeding unit configured to feed the sheet from a paper feeding tray on which the sheet is stacked to the image forming unit via a paper conveying path; an air blowing unit configured to perform air blowing on the sheet stacked on the paper feeding tray; and a paper type detection unit configured to detect a type of the sheet, the paper type detection unit being disposed on the paper conveying path, wherein, in a case where a type of a first sheet detected by the paper type detection unit is a type that requires the air blowing, air blowing is performed on a second sheet that is fed subsequent to the first sheet after the image forming unit performs printing on the first sheet, wherein air blowing is not performed at least during a period from when the paper type detection unit detects the type of the first sheet to when the first sheet is fed to the image forming unit.

Further features of the present disclosure will become apparent from the following description of exemplary embodiments with reference to the attached drawings.

DESCRIPTION OF THE EMBODIMENTS

An exemplary embodiment for implementing the present disclosure will be described below with reference to the drawings. The exemplary embodiment that will be described below is merely an example, and the present disclosure is not limited to the exemplary embodiment that will be described below.

<General Configuration of Image Forming Apparatus>

Figure 1:
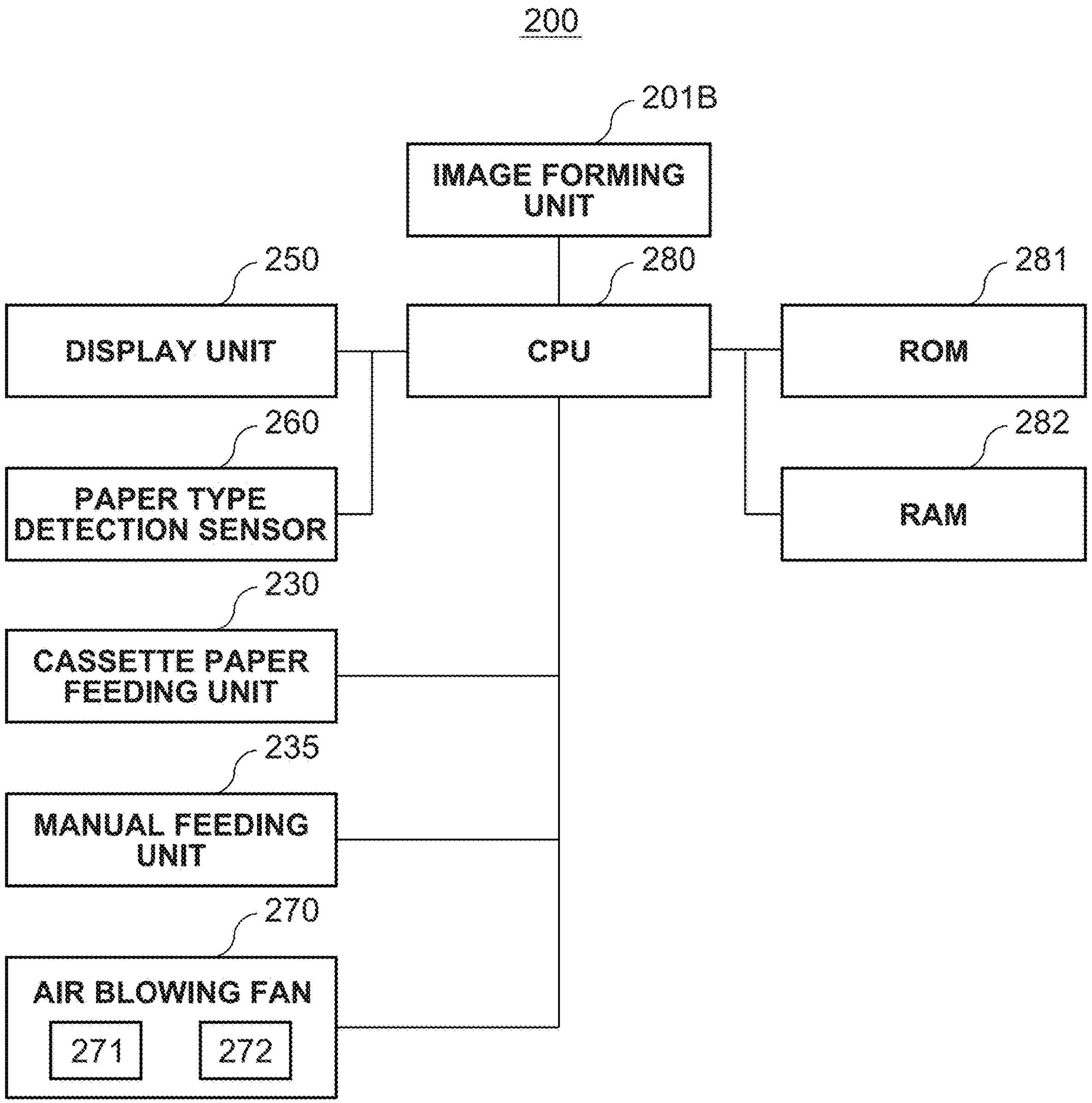
FIG. 1 is a block diagram illustrating a configuration example of a control system of an image forming apparatus according to an exemplary embodiment of the present disclosure.

FIG. 1 is a block diagram illustrating a configuration example of a control system of an image forming apparatus 200 according to the exemplary embodiment of the present disclosure.

As illustrated in FIG. 1, the image forming apparatus 200 includes, as the control system, an image forming unit 201B, a cassette paper feeding unit 230, a manual feeding unit 235, a display unit 250, a paper type detection sensor 260, an air blowing fan 270, a central processing unit (CPU) 280, a read-only memory (ROM) 281, and a random-access memory (RAM) 282.

The CPU 280 controls the whole of the image forming apparatus 200. The ROM 281 stores a control program according to the present exemplary embodiment, initial values of various kinds of setting values, and the like. The CPU 280 executes a control program that is according to the present exemplary embodiment and read from the ROM 281, and thereby implements a procedure of image forming processing, which will be described below, and procedures of processing in each flowchart. The RAM 282 stores various kinds of information under control of the CPU 280. For example, the RAM 282 stores a print control parameter for each paper type in a first storage area. The RAM 282 is desirably a rewritable memory that does not need a storage holding operation. Furthermore, in a case where a user changes a print control parameter corresponding to a referred paper type, the CPU 280 additionally stores the changed print control parameter as a user-defined print control parameter corresponding to the paper type in the above-mentioned first storage area.

The display unit 250 includes a panel that is configured to display an operation screen, a button, and the like. When an instruction for starting a print operation or the like is input, the display unit 250 transmits instruction information to the CPU 280. The instruction information regarding the start of the print operation or the like may be input by the user operating the display unit 250, as well as from an external apparatus, such as a personal computer, a tablet terminal apparatus, and a smartphone, connected via a network (not illustrated). When the instruction information regarding the start of the print operation is input, the CPU 280 controls driving of a paper feeding motor (not illustrated) in response to the instruction information to perform feeding and conveyance of a sheet. Additionally, the CPU 280 sets a print control parameter for the image forming unit 201B, and thereby controls image formation (print) performed by the image forming unit 201B. The image forming unit 201B is an image forming means for performing print on a sheet based on the print control parameter set by the CPU 280.

The cassette paper feeding unit 230 is a paper feeding means for feeding a sheet from a paper feeding cassette, on which paper is stacked, to the image forming unit 201B via a paper conveying path. Additionally, the manual feeding unit 235 is a paper feeding means for feeding a sheet from a manual feeding tray, on which paper is stacked, to the image forming unit 201B via a paper conveying path.

The paper type detection sensor 260 is disposed on the paper conveying path and measures a feature amount of paper to be fed via the paper conveying path to detect a type of paper (paper type). The paper type means a type of paper.

The air blowing fan 270 is an air blowing means for blowing air to sheets stacked on the manual feeding tray of the manual feeding unit 235 based on the control of the CPU 280. The air blowing fan 270 includes a fan motor 271 and a blowing nozzle 272.

Figure 2:
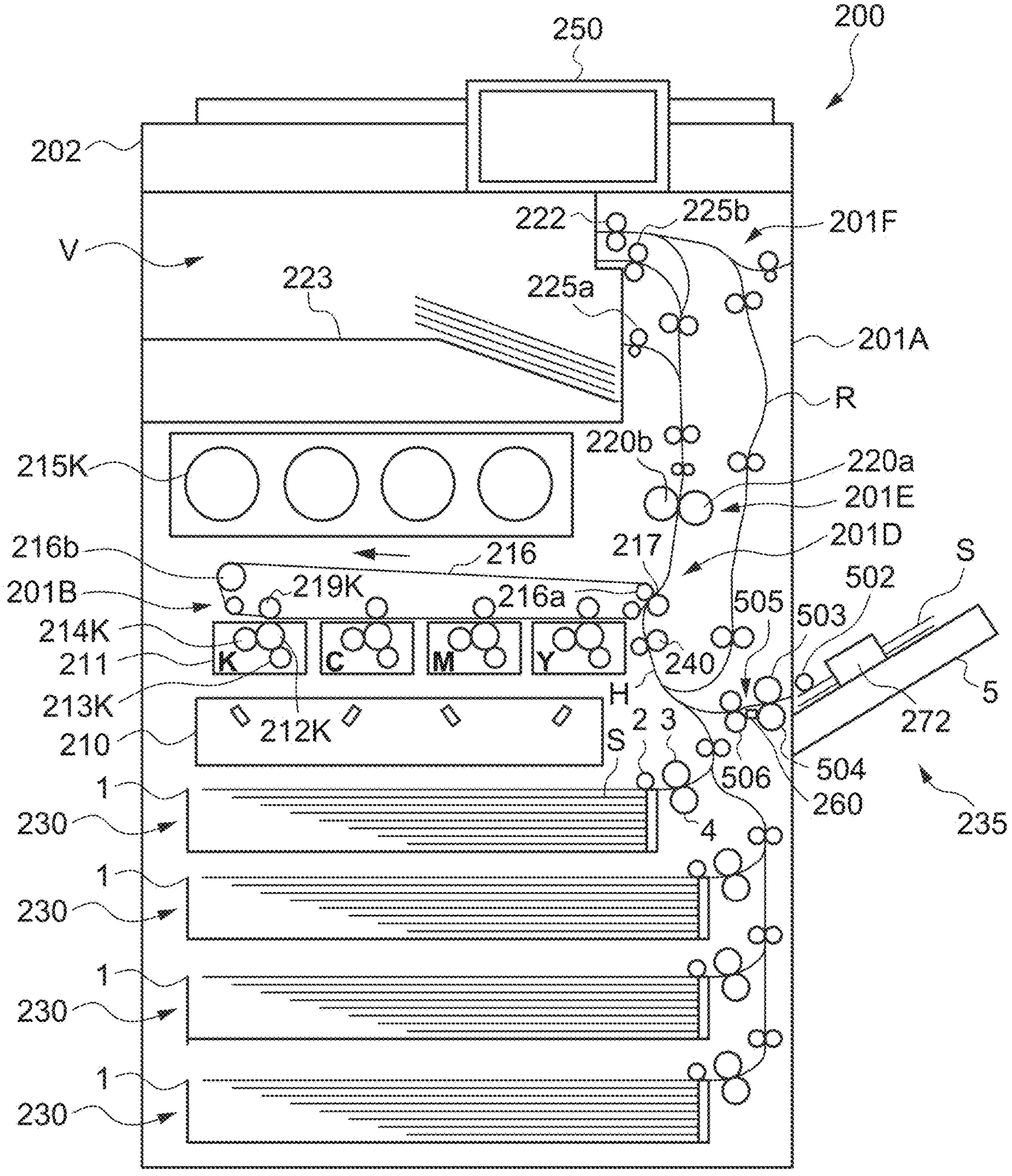
FIG. 2 is a cross-sectional view illustrating an example of a general configuration of the image forming apparatus according to the exemplary embodiment of the present disclosure.

FIG. 2 is a cross-sectional view illustrating an example of a general configuration of the image forming apparatus 200 according to the exemplary embodiment of the present disclosure. In FIG. 2, a component that is identical to a component illustrated in FIG. 1 is denoted by an identical reference sign, and a detailed description thereof is omitted.

The image forming apparatus 200 illustrated in FIG. 2 includes an image forming apparatus main body 201A, an image reading device 202, and the display unit 250.

The image forming apparatus main body 201A includes the image forming unit 201B that forms an image on a sheet S that has been conveyed via a paper conveying path H. Additionally, the image forming apparatus main body 201A includes the cassette paper feeding unit 230 that feeds the sheet S from a paper feeding cassette 1 that is the paper feeding means that accommodates the sheet S. The cassette paper feeding unit 230 includes a separation unit composed of a pickup roller 2 that is the paper feeding means, and a feeding roller 3 and a retard roller 4 for separating the sheet S sent from the pickup roller 2. Additionally, the image forming apparatus main body 201A includes the manual feeding unit 235 that is the paper feeding means that feeds the sheet S to the image forming unit 201B via the paper conveying path H from a manual feeding tray 5 on which the sheet S is stacked and that holds the sheet S. In the same way as the cassette paper feeding unit 230, the manual feeding unit 235 includes a pickup roller 502 that is the paper feeding means, and a feeding roller 503 and a retard roller 504 that constitute a separation unit. Additionally, the image forming apparatus main body 201A includes an air blowing fan that is the air blowing means that blows air to the sheet S stacked on the manual feeding tray 5. FIG. 2 illustrates the blowing nozzle 272 included in the air blowing fan. Furthermore, the image forming apparatus main body 201A includes detection sensors disposed on the paper conveying path H, which are the paper type detection sensor (media sensor) 260 for measuring a feature amount of the sheet S and detecting a type of the sheet S, and a paper detection sensor 505 that detects the sheet S.

The image forming unit 201B is an image forming means for performing printing on the sheet S and is configured to be a four-drum full-color system. Specifically, the image forming unit 201B includes a laser scanner 210 and four process cartridges 211 that form toner images in four colors of yellow (Y), magenta (M), cyan (C), and black (K). The process cartridge 211 for black includes a photosensitive drum 212K, a charging device 213K that is a charging means, and a developing device 214K that is a developing means. Additionally, the image forming unit 201B includes a secondary transfer unit 201D and a fixing unit 201E, which are disposed above the process cartridges 211. A toner cartridge 215K is a toner cartridge for supplying toner to the developing device 214K.

The secondary transfer unit 201D includes a transfer belt 216 wound around a driving roller **216*a* and a tension roller 216*b*. A primary transfer roller 219K in contact with the transfer belt 216 at a position facing the photosensitive drum 212K is disposed inside the transfer belt 216. The transfer belt 216 mentioned herein is rotated in an arrow direction in FIG. 2 by the driving roller 216*a* that is driven by a driving unit (not illustrated). A secondary transfer roller 217 that transfers a color image formed on the transfer belt 216 to the sheet S is disposed at a position facing the driving roller 216*a* of the secondary transfer unit 201D. Furthermore, the fixing unit 201E is disposed above the secondary transfer roller 217, and a first discharge roller pair 225*a*, a second discharge roller pair 225*b*, and a double-sided reverse unit 201F are disposed at the upper left of the fixing unit 201E. The double-sided reverse unit 201F is provided with a reverse roller pair 222 capable of rotating forward and backward, and a paper re-conveying path R for re-conveying the sheet S on which an image is formed on one side thereof to the image forming unit 201**B.

The image reading device 202 is an image reading device installed above the image forming apparatus main body 201A in a substantially horizontal manner. A discharge space V for discharging paper is formed between the image reading device 202 and the image forming apparatus main body 201A.

The display unit 250 is disposed above the image forming apparatus 200 and is a display unit to which an operation can be input and that accepts input of an operation from the user.

<Operation of Image Forming Apparatus>

An operation of the image forming apparatus 200 will now be described.

First, when accepting image information regarding a document to be printed, the image forming apparatus 200 performs image processing on the image information, and then, converts the image information into an electric signal, and transmits the electric signal to the laser scanner 210 of the image forming unit 201B. In the image forming unit 201B, a surface of the photosensitive drum 212K uniformly charged in predetermined polarity and at a predetermined potential by the charging device 213K are sequentially exposed to a laser. In this way, electrostatic latent images in yellow, magenta, cyan, and black are sequentially formed on the respective photosensitive drums in the process cartridges 211.

Then, the image forming apparatus 200 develops the electrostatic latent images with toner in respective colors so that the electrostatic latent images are visualized, and sequentially superimposes toner images of respective colors on the respective photosensitive drums upon one another on the transfer belt 216 with a primary transfer bias applied to the primary transfer roller 219K. With the operation, the toner images are formed on the transfer belt 216. Additionally, in parallel with the toner image forming operation, the sheet S is conveyed to a registration roller pair 240 one sheet by one sheet by the cassette paper feeding unit 230 via the paper conveying path H, and is subjected to skew correction by the registration roller pair 240. After the skew correction, the sheet S is conveyed by the registration roller pair 240 to the secondary transfer unit 201D. In the secondary transfer unit 201D, the toner images are collectively transferred to the sheet S with a secondary transfer bias applied to the secondary transfer roller 217. Subsequently, the sheet S on which the toner images have been transferred is conveyed to the fixing unit 201E, and toner in respective colors is melted and mixed in color by application of heat and pressure in a roller nip portion composed of a pressure roller 220*a* and a heating roller 220*b* and is fixed to the sheet S as a color image. Then, the sheet S to which the image has been fixed is discharged into the discharge space V by the first discharge roller pair 225*a* and the second discharge roller pair 225*b* on the downstream side of the fixing unit 201E, and is stacked on a stacking unit 223 that protrudes from a bottom surface of the discharge space V. In a case where images are formed on both sides of the sheet S, an image is fixed, and then the sheet S is conveyed to the paper re-conveying path R by the reverse roller pair 222 and is re-conveyed to the image forming unit 201B.

The paper type detection sensor 260 is a paper type detection means that is disposed on the paper conveying path H and measures a feature amount of the sheet S to be fed via the paper conveying path H to detect a type of the sheet S (paper type).

For example, the paper type detection sensor 260 detects the feature amount of the conveyed sheet S such as a surface property and a thickness, and the CPU 280 determines the type of the sheet S (paper type) from a result of the detection. In the present exemplary embodiment, processing by the paper type detection sensor 260 detecting the feature amount of the sheet S such as the surface property and the thickness and the CPU 280 determining the type of the sheet S (paper type) from a result of the detection is defined as processing by the paper type detection sensor 260 detecting the type of the sheet S (paper type).

<General Configuration of Paper Type Detection Sensor and Paper Type Detection Processing>

Next, a description will be given of a general configuration of the paper type detection sensor 260 illustrated in FIGS. 1 and 2 and paper type detection processing performed by the paper type detection sensor 260.

Figure 3:
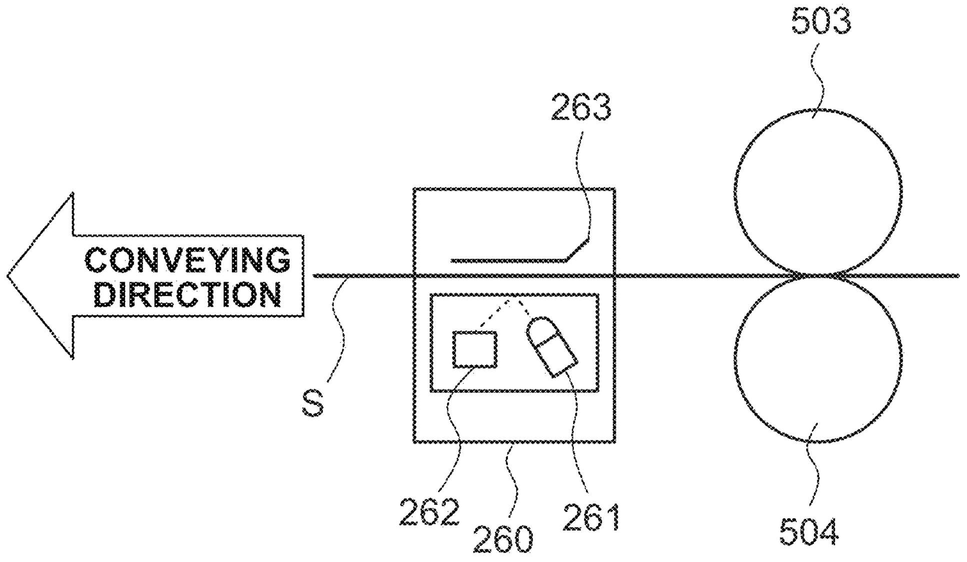
FIG. 3 is a cross-sectional view illustrating an example of a general configuration of a paper type detection sensor illustrated in FIGS. 1 and 2.

FIG. 3 is a cross-sectional view illustrating an example of a general configuration of the paper type detection sensor 260 illustrated in FIGS. 1 and 2. In FIG. 3, a component that is similar to that illustrated in FIG. 1 or 2 is denoted by the same reference sign, and a detailed description thereof is omitted.

The paper type detection sensor 260 includes therein a light emitting diode (LED) 261 as a light emitting element, a photodiode 262 as a light receiving element, and a guide portion 263 for guiding the sheet S. Specifically, the paper type detection sensor 260 detects an amount of reflected light emitted from the LED 261 with the photodiode 262. The CPU 280 receives a detection signal from the photodiode 262 in the paper type detection sensor 260 as an output value of the paper type detection sensor 260. The CPU 280 determines the type of the supplied sheet S depending on a difference in received values due to the feature amount of each sheet S, such as the surface property and the thickness. The CPU 280 then optimally controls image forming speed and a target temperature of a fixing device depending on the determined type of the sheet S.

As described above, in the present exemplary embodiment, the CPU 280 uses the output value of the paper type detection sensor 260 to determine the type of the sheet S, resulting in the user not having to make settings while being conscious about the type of the sheet S. Hence, in the image forming apparatus 200 according to the present exemplary embodiment, there is prepared a mode of detecting the type of the sheet S by the paper type detection sensor 260 and automatically setting a print control parameter or the like based on the detected type of the sheet S (hereinafter referred to as a "medium automatically setting mode"). Meanwhile, in the image forming apparatus 200 according to the present exemplary embodiment, there is also prepared a mode of manually setting the type of the sheet S to be used by the user in a conventional manner (hereinafter referred to a "medium manually setting mode"). The user can preliminarily set either the medium automatically setting mode or the medium manually setting mode for each cassette paper feeding unit 230 by operating the display unit 250. The medium automatically setting mode is set as a default mode. Additionally, a setting value indicating whether the setting mode is the medium automatically setting mode or the medium manually setting mode is stored in the RAM 282 illustrated in FIG. 1. The general configuration of the paper type detection sensor 260 illustrated in FIG. 3 is an example, and the configuration thereof is not limited thereto in the present disclosure. The paper type detection sensor 260 may have a configuration, for example, in which an ultrasonic sensor such as a piezoelectric element is combined with the light emitting element such as the LED 261 and the light receiving element such as the photodiode 262, or may be a sensor having a configuration including a component other than the above components.

<General Configuration of Manual Feeding Unit and Paper Feeding Processing>

Subsequently, a description will be given of a general configuration of the manual feeding unit 235 illustrated in FIGS. 1 and 2 and paper feeding processing performed by the manual feeding unit 235.

Figure 4:
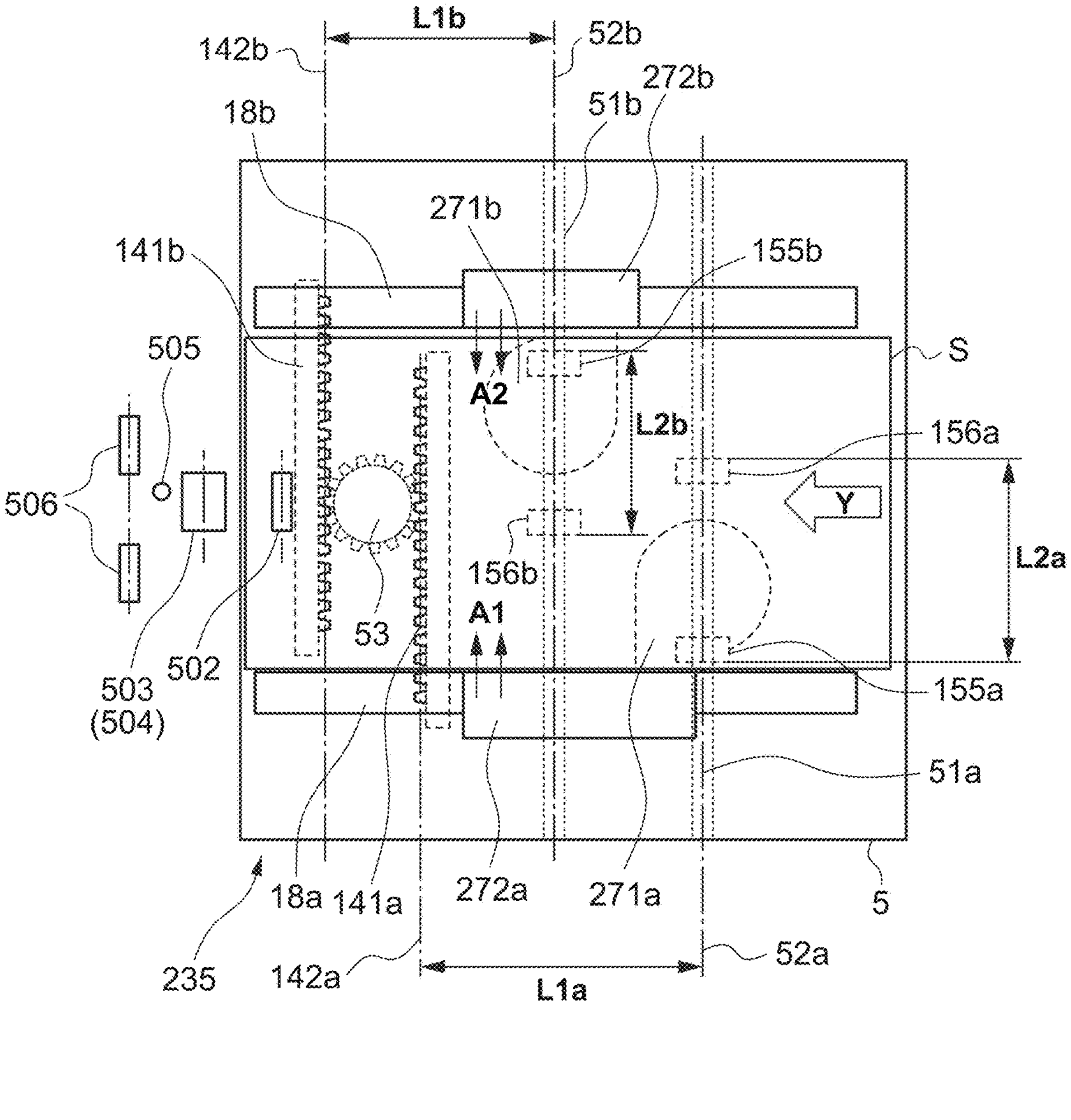
FIG. 4 is a view illustrating an example of a general configuration of a manual feeding unit illustrated in FIGS. 1 and 2.

FIG. 4 is a view illustrating an example of the general configuration of the manual feeding unit 235 illustrated in FIGS. 1 and 2. In FIG. 4, a component that is similar to that illustrated in FIG. 1 or 2 is denoted by the same reference sign, and a detailed description thereof is omitted.

The manual feeding unit 235 includes the manual feeding tray 5, the pickup roller 502, the feeding roller 503, the retard roller 504, side end regulation plates 18*a* and 18*b*, side end regulation racks 141*a* and 141*b*, and a pinion gear 53. Furthermore, the manual feeding unit 235 includes fan motors 271*a* and 271*b* constituting the air blowing fan 270 as the air blowing means, blowing nozzles 272*a* and 272*b*, and supporting shafts 51*a* and 51*b* that support the air blowing fan 270.

The side end regulation plates 18*a* and 18*b* are components for regulating the position of the sheet S in a direction orthogonal to an arrow Y indicating a conveying direction of the sheet S. The fan motors 271*a* and 271*b* are respectively attached to the side end regulation plates 18*a* and 18*b*. The fan motor 271*a* moves together with the side end regulation plate 18*a*, and the fan motor 271*b* moves together with the side end regulation plate 18*b*. The fan motors 271*a* and 271*b* enable air blowing on the sheet S via the blowing nozzles 272*a* and 272*b*. The air from the fan motor 271*a* is blown toward an end portion of the sheet S via the blowing nozzle 272*a* as indicated by flow lines A1, and the air from the fan motor 271*b* is blown toward another end portion of the sheet S via the blowing nozzle 272*b* as indicated by flow lines A2, whereby the sheet S in an upper portion of the sheet bundle floats, and a sticking force between sheets of the sheet bundle decreases.

For example, when a start button is pressed, paper feeding is started. For example, in a case where the type of the sheet S is coated paper, the fan motors 271*a* and 271*b* operate to perform air blowing on the end portions of the sheet S in a paper width direction via the blowing nozzles 272*a* and 272*b*. After the elapse of a predetermined amount of time, the uppermost sheet S in a state where the sticking force between sheets decreases is sent to a separation unit, composed of the feeding roller 503 and the retard roller 504, by the rotation of the pickup roller 502. A leading end of the sheet S that has been separated to be a single sheet is detected by the paper detection sensor 505, and the type of the sheet S (paper type) is detected by the paper type detection sensor 260.

Then, the sheet S is sent to the registration roller pair 240 by a conveyance roller pair 506 via the paper conveying path H.

A subsequent operation of the manual feeding unit 235 is similar to the above-mentioned operation of the cassette paper feeding unit 230. A timing is determined, and a toner image is transferred to the sheet S in the secondary transfer unit 201D. Then, the toner image is fixed to the sheet S in the fixing unit 201E, and the sheet S is discharged to the stacking unit 223 by the first discharge roller pair 225*a*. When images are to be formed on both sides of the sheet S, the sheet S is reversed by the double-sided reverse unit 201F, passes through the paper re-conveying path R, and is conveyed again to the registration roller pair 240. Then, similar to the case of forming an image on a first side, the sheet S with images have been formed on both sides thereof, is discharged to the stacking unit 223, and a series of image formation processes ends.

In the manual feeding unit 235 illustrated in FIG. 4, the side end regulation racks 141*a* and 141*b* are coupled with each other via the pinion gear 53 that is rotatably supported by the manual feeding tray 5. FIG. 4 illustrates a distance between an engaging pitch line 142*a* of the side end regulation rack 141*a* and the pinion gear 53, and a center line 52*a* of the supporting shaft 51*a* as a rack-supporting shaft distance L1*a*. Further, FIG. 4 illustrates a distance between shaft holding portions 155*a* and 156*a* of the supporting shaft 51*a* as a shaft holding interval distance L2*a*. Similarly, FIG. 4 illustrates a distance between an engaging pitch line 142*b* of the side end regulation rack 141*b* and the pinion gear 53, and a center line 52*b* of the supporting shaft 51*b* as a rack-supporting shaft distance L1*b*. Further, FIG. 4 illustrates a distance between shaft holding portions 155*b* and 156*b* of the supporting shaft 51*b* as a shaft holding interval distance L2*b*.

<Settings of Sheet Placed on Manual Feeding Tray>

Figure 5A:
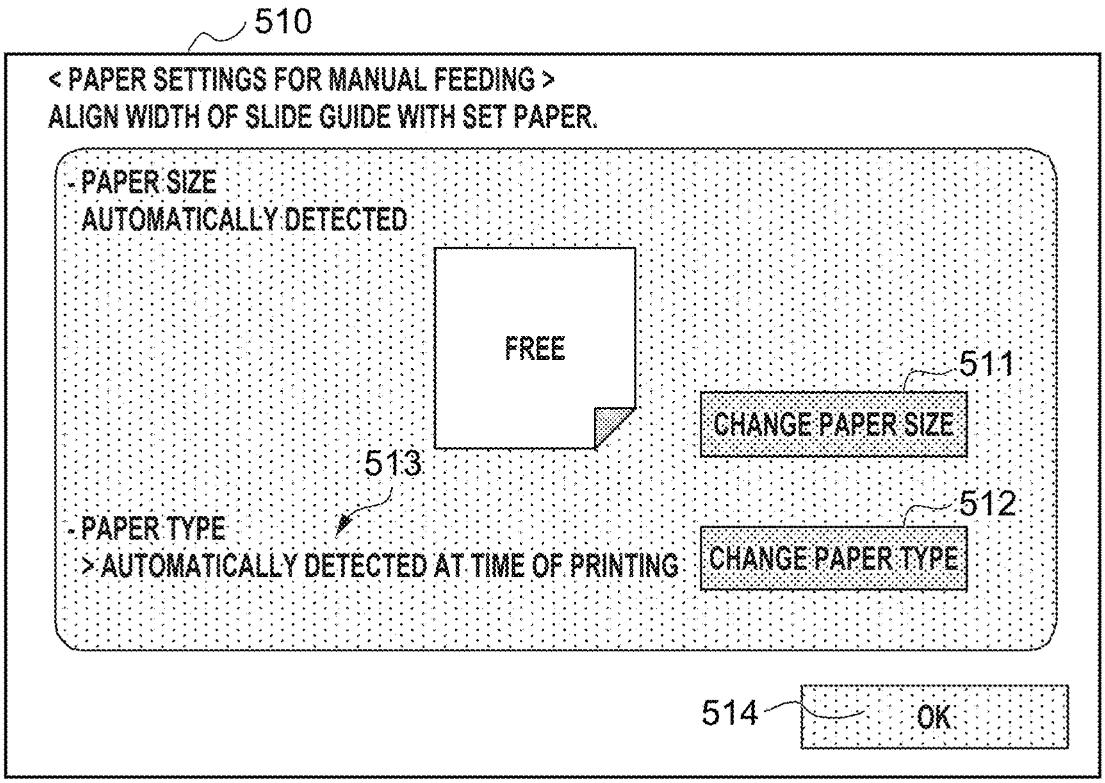
FIGS. 5A and 5B are views illustrating the exemplary embodiment of the present disclosure and each illustrating an example of a setting screen for a sheet placed on a manual feeding tray.
Figure 5B:
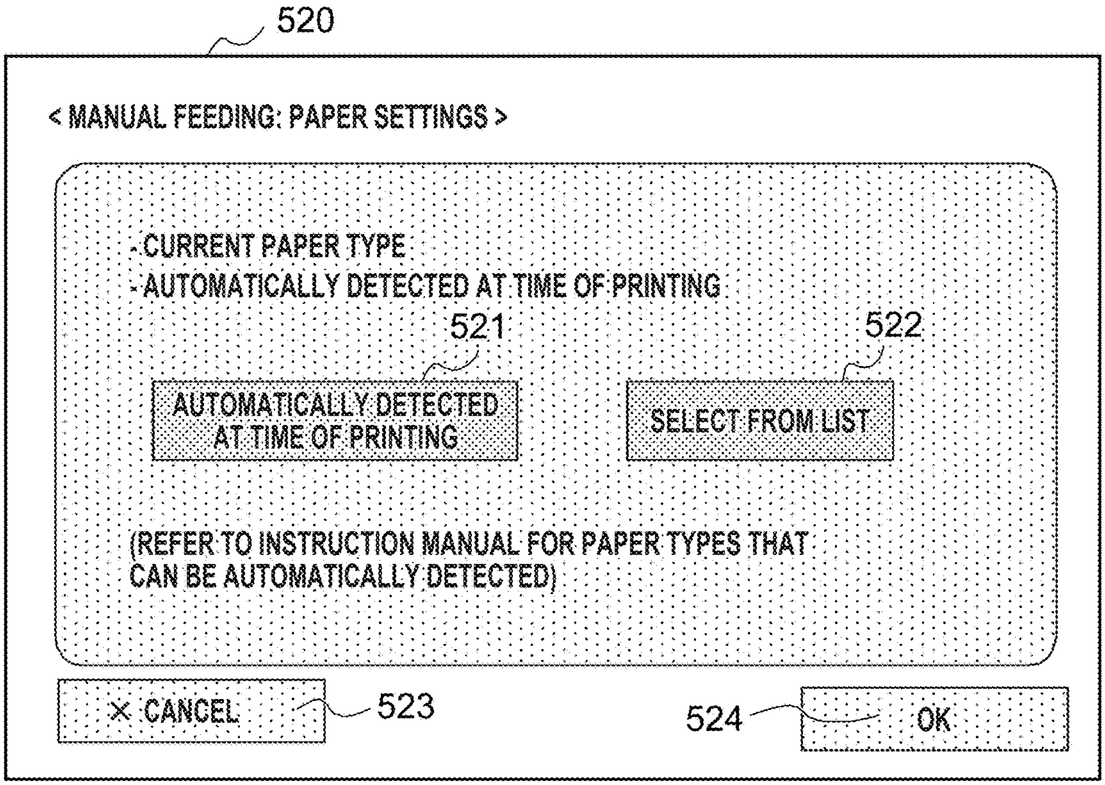

FIGS. 5A and 5B are views illustrating the exemplary embodiment of the present disclosure and respectively illustrating examples of setting screens 510 and 520 for the sheet S placed on the manual feeding tray 5. The setting screens 510 and 520 respectively illustrated in FIGS. 5A and 5B are displayed on the display unit 250 under control of the CPU 280.

Specifically, FIG. 5A illustrates the setting screen 510 displayed on the display unit 250 when the sheet S is placed on the manual feeding tray 5. On the setting screen 510 illustrated in FIG. 5A, there are a "CHANGE PAPER SIZE" button 511, a "CHANGE PAPER TYPE" button 512, a display area 513 in which a currently set paper type is displayed, and an "OK" button 514. On the setting screen 510 illustrated in FIG. 5A, it is possible to change a setting of a paper size and a setting of a paper type, and designate the paper type by pressing the "CHANGE PAPER TYPE" button 512.

When the "CHANGE PAPER TYPE" button 512 is pressed on the setting screen 510 illustrated in FIG. 5A, the setting screen 510 shifts to the setting screen 520 illustrated in FIG. 5B. On the setting screen 520 illustrated in FIG. 5B, there are an "AUTOMATICALLY DETECTED AT TIME OF PRINTING" button 521, a "SELECT FROM LIST" button 522, a "CANCEL" button 523, and an "OK" button 524. The "AUTOMATICALLY DETECTED AT TIME OF PRINTING" button 521 is a setting button for execution of an operation of detecting, with the paper type detection sensor 260, the type of the sheet S that has been fed from the manual feeding tray 5. When the "SELECT FROM LIST" button 522 is pressed, the CPU 280 displays a paper type list screen (not illustrated) on the display unit 250, which makes it possible to freely select a paper type. At this time, a list of types of paper (paper types) existing in a paper type database preliminarily stored in the ROM 281 is displayed as a paper type list displayed on the display unit 250. After the "AUTOMATICALLY DETECTED AT TIME OF PRINTING" button 521 is pressed or the type of the sheet S is selected from the paper type list screen (not illustrated) and then the "OK" button 524 is pressed on the setting screen 520 illustrated in FIG. 5B, the setting screen 520 returns to the setting screen 510 illustrated in FIG. 5A. When the "OK" button 514 is pressed on the setting screen 510 illustrated in FIG. 5A, the CPU 280 stores setting information regarding the sheet S placed on the manual feeding tray 5 in the ROM 281 (or the RAM 282).

<Processing Procedure of Image Forming Processing for Print Job>

Figure 6:
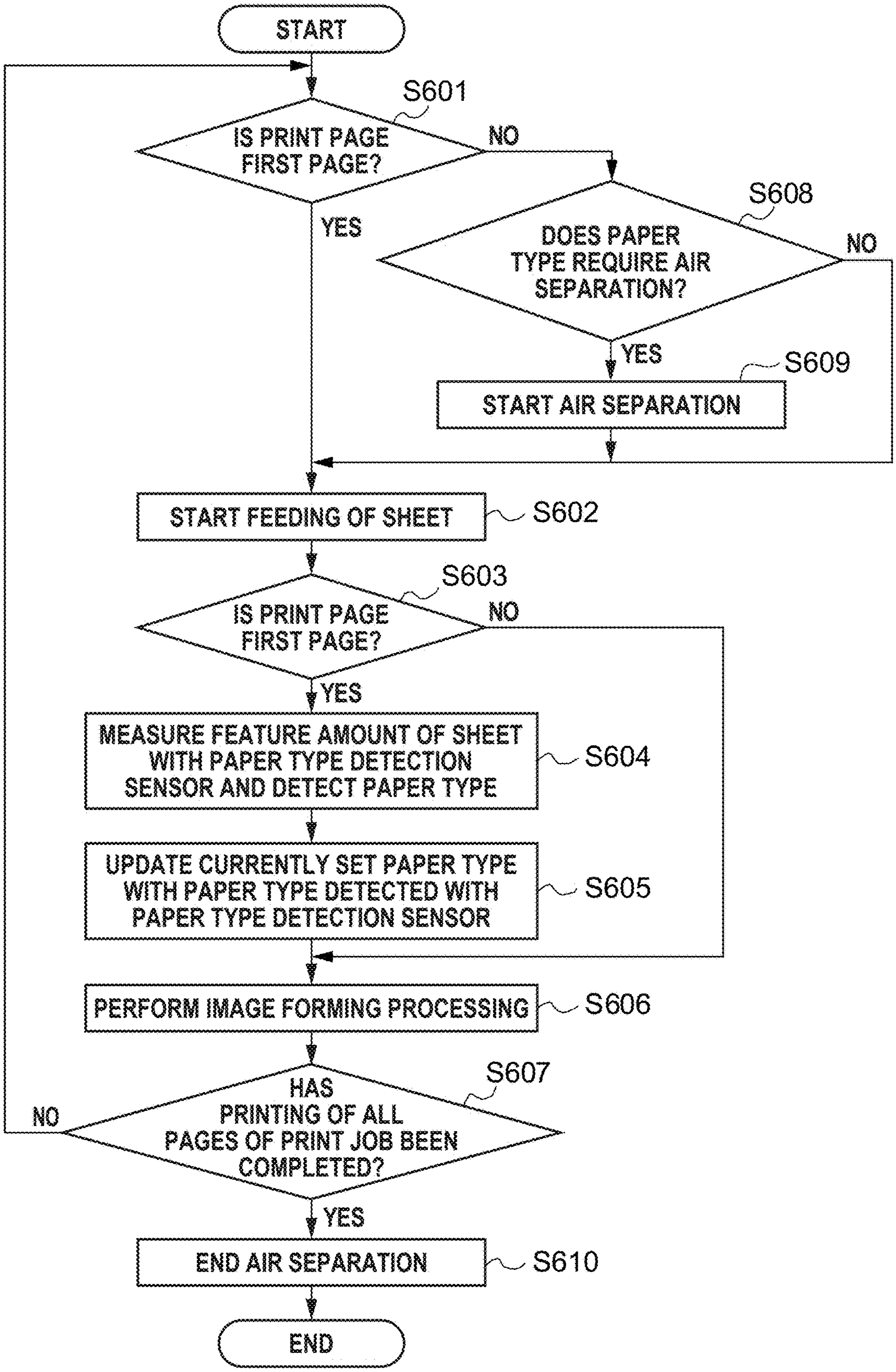
FIG. 6 is a flowchart illustrating an example of a processing procedure in a method for controlling the image forming apparatus according to the exemplary embodiment of the present disclosure.

FIG. 6 is a flowchart illustrating an example of a processing procedure in a method for controlling the image forming apparatus 200 according to the present exemplary embodiment of the present disclosure. Specifically, FIG. 6 is a flowchart illustrating an example of a processing procedure in the image forming processing for a print job, and including a step of performing control to determine whether to perform the air blowing (air separation) on the sheet S with the air blowing fan 270 according to the present exemplary embodiment. Each step of the flowchart in FIG.

6 is implemented by the CPU 280 executing a control program read from the ROM 281 and loaded into the RAM 282.

The flowchart illustrated in FIG. 6 is started when the print job is input after the sheet S is placed on the manual feeding tray 5 and "AUTOMATICALLY DETECTED AT TIME OF PRINTING" is set in the paper settings processing described above with reference to FIG. 5B. As the print job mentioned herein, for example, a copy job is executed. In the copy job, a paper feeding portion is set by the user operating the display unit 250 and pressing the "AUTOMATICALLY DETECTED AT TIME OF PRINTING" button 521 illustrated in FIG. 5B. Alternatively, as the print job mentioned herein, a page-description language (PDL) print job may be executed. In the PDL print job, a paper feeding portion is set to the "AUTOMATICALLY DETECTED AT TIME OF PRINTING" by a printer driver on an information processing terminal apparatus, such as a personal computer, that is connected via a network. In a case where the paper feeding portion to which the "AUTOMATICALLY DETECTED AT TIME OF PRINTING" is set in the print job settings, assume that the paper type detection sensor 260 measures a feature amount of the sheet S and performs an operation of detecting the type of the sheet S. Additionally, in a case of a print job that does not explicitly designate the paper type, such as a case of selecting "AUTOMATIC" or "AUTOMATICALLY SELECT" as the paper type of the print job, assume that the paper type detection sensor 260 similarly measures the feature amount of the sheet S and performs an operation of detecting the type of the sheet S. In the following description about the flowchart in FIG. 6, a case where a print job with a plurality of pages is input is assumed, and a description will be sequentially given from processing on the sheet S for a first page of the print job subjected to the detection of the paper type.

First, in step S601 in FIG. 6, the CPU 280 determines whether a print page is the first page of the input print job.

In a case where the print page is the first page of the print job as a result of the determination in step S601 (YES in step S601), the processing proceeds to step S602. Since the description will be sequentially given from the processing on the sheet S for the first page of the print job in the present specification, the processing proceeds to step S602 (in the present exemplary embodiment, the air separation is not started with respect to the sheet S for the first page).

When the processing proceeds to step S602, the CPU 280 starts feeding of the uppermost sheet S stacked on the manual feeding tray 5.

Subsequently, in step S603, the CPU 280 determines whether the print page is the first page of the input print job.

In a case where the print page is the first page of the print job as a result of the determination in step S603 (YES in step S603), the processing proceeds to step S604. Since the description will be sequentially given from the processing on the sheet S for the first page of the print job in the present specification, the processing proceeds to step S604. In step S604, the paper type detection sensor 260, based on control by the CPU 280, measures the feature amount of the sheet S for the first page fed in step S602, and detects the type of the sheet S for the first page.

Subsequently, in step S605, the CPU 280 performs processing of updating the currently set paper type with the paper type detected in step S604. Specifically, in step S605, the CPU 280, for example, updates display of the display area 513 in FIG. 5A to the paper type detected in step S604, and updates the currently set paper type stored in the ROM 281 or the RAM 282 to the paper type detected in step S604.

In a case where the processing in step S605 ends or the CPU 280 determines that the print page is not the first page of the print job in step S603 (NO in step S603), the processing proceeds to step S606. In step S606, the CPU 280 controls the image forming unit 201B to execute the image forming processing on the sheet S that has been started to be fed in step S602, and performs printing on the sheet S. Then, the printed sheet S is discharged into the discharge space V and stacked on the stacking unit 223.

Subsequently, in step S607, the CPU 280 determines whether printing of all pages of the print job has been completed. In a case where printing of all pages of the print job has not been completed (NO in step S607), the processing returns to step S601. Since in the present exemplary embodiment, the case is described where the print job with a plurality of pages is input, and the description has been given of the processing on the sheet S for the first page in steps S601 to S606, a case where the processing returns to step S601 is described below.

When the processing returns to step S601, the CPU 280 determines whether the print page is the first page of the input print job. In a case where the print page is not the first page of the print job as a result of the determination (NO in step S601), the processing proceeds to step S608. Since the processing on the sheet S for the first page of the print job has been completed in the present specification, the processing proceeds to step S608 to perform the processing on the sheet S for second and subsequent pages of the print job.

When the processing proceeds to step S608, the CPU 280 determines whether the type of the sheet S for the first page, which has been detected in step S604, is a paper type that requires air separation in which air is blown from the air blowing fan 270. Whether the paper type is the paper type that requires the air separation is stored as the print control parameter for each paper type in the paper type database (media library) of the ROM 281. In the present exemplary embodiment, it is assumed that the type of the sheet S that requires the air separation is coated paper, and a type of the sheet S that does not require the air separation is plain paper, although these are merely examples.

In a case where the type of the sheet S for the first page, which has been detected in step S604, is the paper type that requires the air separation (coated paper in the present exemplary embodiment) as a result of the determination in step S608 (YES in step S608), the processing proceeds to step S609. In step S609, the CPU 280 starts the air separation in which air is blown from the air blowing fan 270 to the sheet S (sheets S for the second and subsequent pages) on the manual feeding tray 5.

In a case where the processing in step S609 ends or the CPU 280 determines that the type of the sheet S for the first page is the paper type that does not require the air separation in step S608 (plain paper in the present exemplary embodiment) (NO in step S608), the processing proceeds to step S602. When the processing proceeds to step S602, in steps S602 to S607, processing similar to the above-mentioned processing on the sheet S for the first page is performed on the sheets S for the second and subsequent pages. At this time, since the CPU 280 determines NO in step S603 with respect to the sheets S for the second and subsequent pages (NO in step S603), the processing in steps S604 and S605 is not performed.

In a case where printing of all pages of the print page has been completed as a result of the determination in step S607 (YES in step S607), the processing proceeds to step S610. In step S610, the CPU 280 ends air blowing (air separation) with the air blowing fan 270 on the sheet S on the manual feeding tray 5. The flowchart illustrated in FIG. 6 illustrates the processing in a case where the air blowing (air separation) with the air blowing fan 270 is executed throughout the image forming processing on the sheets S for the second and subsequent pages. Alternatively, a mode of executing the air blowing (air separation) for only a predetermined amount of time or every predetermined number of sheets may be employed.

When the processing in step S610 ends, the processing of the flowchart illustrated in FIG. 6 ends.

The above-mentioned image forming apparatus 200 according to the present exemplary embodiment includes the image forming unit 201B as the image forming means for performing printing on the sheet S. Additionally, the image forming apparatus 200 includes the manual feeding unit 235 as the paper feeding means that feeds the sheet S from the manual feeding tray 5, on which the sheet S is stacked, to the image forming unit 201B via the paper conveying path H. Furthermore, the image forming apparatus 200 includes the air blowing fan 270 as the air blowing means that performs air blowing on the sheet S stacked on the manual feeding tray 5, and the paper type detection sensor 260 as the paper type detection means that is disposed on the paper conveying path H and that detects the type of the sheet S. In a case where the type of the sheet (first sheet) S for the first page, which has been detected by the paper type detection sensor 260, is a paper type that requires air blowing, the air blowing fan 270 performs the following processing based on control by the CPU 280 as illustrated in the flowchart in FIG. 6. Specifically, in this case, the air blowing fan 270 does not perform the air blowing on the sheet (second sheet) S for the second page at least during a period from when the paper type detection sensor 260 detects the type of the sheet S for the first page to when the sheet S for the first page is fed to the image forming unit 201B. More specifically, in this case, the air blowing fan 270 does not perform the air blowing on the sheet (second sheet) S for the second page at least during a period from when the paper type detection sensor 260 detects the type of the sheet S for the first page to when the image forming unit 201B performs printing on the sheet S for the first page. In this case, after the image forming unit 201B performs printing on the sheet (first sheet) S for the first page (in step S606 in FIG. 6), the air blowing fan 270 performs the air blowing on the sheet (second sheet) S for the second page on the manual feeding tray 5 (in step S609 in FIG. 6).

With this configuration, in a case where the air blowing needs to be performed on the sheet (second sheet) S prior to feeding, it is possible to suppress power consumption due to unnecessary air blowing.

Figure 7:
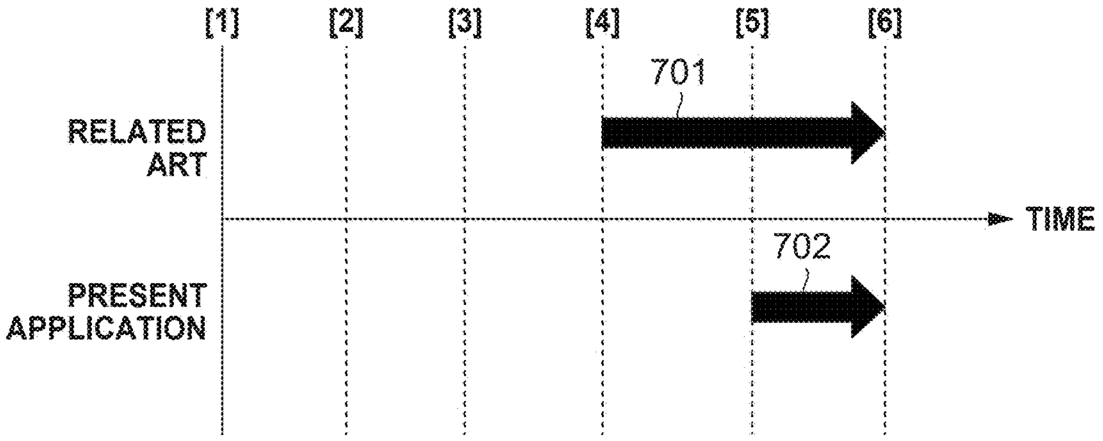
FIG. 7 is a chart schematically illustrating a timing of execution of air separation in the image forming apparatus according to the exemplary embodiment of the present disclosure and a timing of execution of air separation in an image forming apparatus described in Japanese Patent Application Laid-Open No. 2010-32632.

FIG. 7 is a chart schematically illustrating a timing of execution of the air separation in the image forming apparatus 200 according to the exemplary embodiment of the present disclosure and a timing of execution of air separation in the image forming apparatus described in Japanese Patent Application Laid-Open No. 2010-32632. Specifically, FIG. 7 illustrates, with a black arrow 701, the timing of execution of the air separation in the image forming apparatus described in Japanese Patent Application Laid-Open No. 2010-32632, and illustrates, with a black arrow 702, a timing of execution of the air separation in the image forming apparatus 200 according to the exemplary embodiment of the present disclosure. The image forming apparatus 200 according to the present exemplary embodiment, as indicated by the black arrow 702, does not perform the air separation in a period from a point of time [4] to a point of time [5] during which the image forming apparatus described in Japanese Patent Application Laid-Open No. 2010-32632 performs the air separation. More specifically, the image forming apparatus 200 according to the present exemplary embodiment does not execute the air separation during a period from when the paper type detection sensor 260 detects the type of the sheet S for the first page (the point of time [4]) to when the image forming unit 201B performs printing on the sheet S for the first page (the point of time [5]). With this configuration, the image forming apparatus 200 according to the present exemplary embodiment is capable of, in a case where the air blowing needs to be performed on the sheet S prior to feeding, suppressing power consumption due to unnecessary air blowing in comparison with the image forming apparatus described in Japanese Patent Application Laid-Open No. 2010-32632.

The above-mentioned exemplary embodiment of the present disclosure is merely a specific example for implementing the present disclosure, and the technical scope of the present disclosure should not be interpreted in a limited manner by the exemplary embodiment. In other words, the present disclosure can be implemented in various modes without departing from the technical idea of the present disclosure or the principal features of the present disclosure.

According to the present disclosure, in a case where the air blowing needs to be performed on a sheet prior to feeding, it is possible to suppress power consumption due to unnecessary air blowing.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-181299, filed Oct. 20, 2023, which is hereby incorporated by reference herein in its entirety.

What is claimed is:

1. An image forming apparatus comprising:

an image forming unit configured to perform printing on a sheet;

a paper feeding unit configured to feed the sheet from a paper feeding tray on which the sheet is stacked to the image forming unit via a paper conveying path;

an air blowing unit configured to perform air blowing on the sheet stacked on the paper feeding tray;

a paper type detection unit configured to detect a type of the sheet, the paper type detection unit being disposed on the paper conveying path: and a controller that causes, where a type of a first sheet detected by the paper type detection unit is a type that requires the air blowing, the air blowing unit to perform air blowing on a second sheet that is fed subsequent to the first sheet after the image forming unit performs printing on the first sheet, wherein the controller does not cause the air blowing unit to perform air blowing at least during a period from when the paper type detection unit detects the type of the first sheet to when the first sheet is fed to the image forming unit.

2. The image forming apparatus according to claim 1, wherein, the air blowing unit performs air blowing on the second sheet after the image forming unit performs printing on the first sheet in a case where the detected type of the first sheet is the type that requires the air blowing.

3. The image forming apparatus according to claim 1, wherein a type of the sheet that requires the air blowing is coated paper, and wherein a type of the sheet that does not require the air blowing is plain paper.

4. A method for controlling an image forming apparatus including an image forming unit configured to perform printing on a sheet, a paper feeding tray, and a paper type detection unit configured to detect a type of the sheet, the paper type detection unit being disposed on a paper conveying path, the method comprising:

feeding the sheet from the paper feeding tray on which the sheet is stacked to the image forming unit via the paper conveying path; and performing air blowing on the sheet stacked on the paper feeding tray, wherein, where a type of a first sheet detected by the paper type detection unit is a type that requires the air blowing, the air blowing is not performed on a second sheet to be fed subsequent to the first sheet at least during a period from when the paper type detection unit detects the type of the first sheet to when the first sheet is fed to the image forming unit, and the air blowing is performed on the second sheet after the image forming unit performs printing on the first sheet.

5. A non-transitory computer readable storage medium storing instructions that, upon execution by at least one processor of an image forming apparatus including an image forming unit configured to perform printing on a sheet, a paper feeding tray, and a paper type detection unit configured to detect a type of the sheet, the paper type detection unit being disposed on a paper conveying path, control an image processing apparatus to execute a method for controlling the image forming apparatus, the method comprising:

feeding the sheet from the paper feeding tray on which the sheet is stacked to the image forming unit via the paper conveying path; and performing air blowing on the sheet stacked on the paper feeding tray, wherein, where a type of a first sheet detected by the paper type detection unit is a type that requires the air blowing, the air blowing is not performed on a second sheet to be fed subsequent to the first sheet at least during a period from when the paper type detection unit detects the type of the first sheet to when the first sheet is fed to the image forming unit, and the air blowing is performed on the second sheet after the image forming unit performs printing on the first sheet.

* * * * *